Patented Oct. 31, 1922.

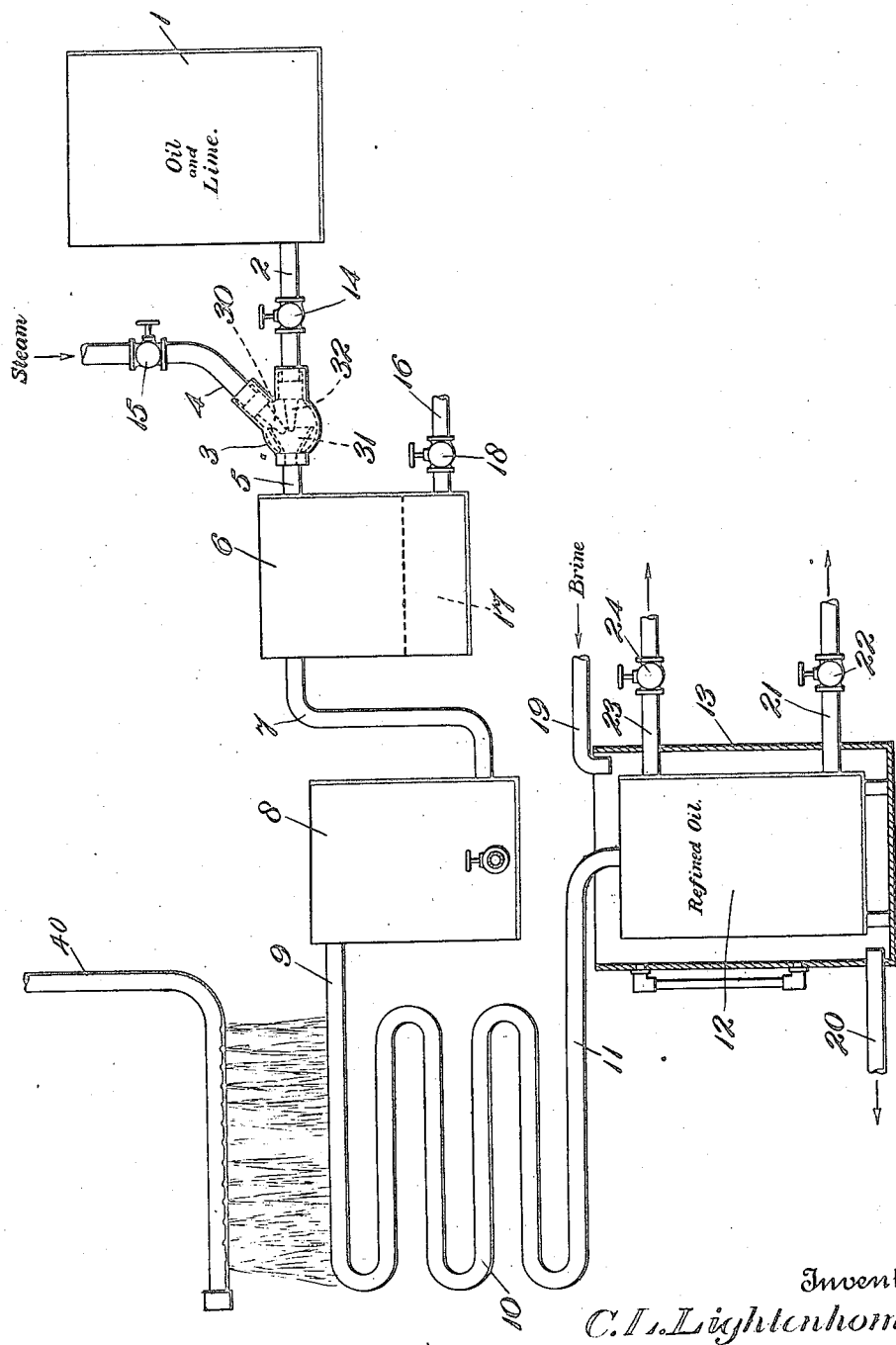

1,434,300

UNITED STATES PATENT OFFICE.

CHARLES L. LIGHTENHOME, OF NEW YORK, N. Y., ASSIGNOR TO LIGHTENHOME OIL & REFINING COMPANY, OF NEW YORK, N. Y., A CORPORATION OF NEW YORK.

PROCESS FOR PRODUCING HYDROCARBON PRODUCTS.

Application filed September 14, 1917. Serial No. 191,454.

*To all whom it may concern:*

Be it known that I, CHARLES L. LIGHTENHOME, a citizen of the United States, residing at New York city, in the county of New York and State of New York, have invented certain new and useful Improvements in Processes for Producing Hydrocarbon Products; and I do hereby declare the following to be a full, clear, and exact description of the invention, such as will enable others skilled in the art to which it appertains to make and use the same.

This invention relates to a process for producing hydrocarbon products and has for its object to improve the processes of this nature which have been heretofore proposed.

With these and other objects in view the invention consists in the novel steps and combinations of steps constituting the process, and in the novel parts and combinations of parts constituting the apparatus all as will be more fully hereinafter disclosed and particularly pointed out in the claims.

Referring to the accompanying drawing forming a part of this specification in which the figure is a diagrammatic elevational view of one form of apparatus suitable for carrying out the invention, 1 indicates any suitable reservoir or receptacle for containing any suitable hydrocarbon, 2 a pipe leading therefrom to the suction mechanism 3 into which leads the steam pipe 4, and from which leads the connection 5 to the collecting chamber 6. From said chamber 6 leads the connection 7 joined to the separating chamber 8 from which leads the pipe 9 connecting the condenser or cooling coil 10, which in turn is joined as by the pipe 11 to the refrigerating or condensing tank 12, surrounded by the cooling or brine tank 13 as shown. A sprinkling means 40 is conveniently associated with the pipe 9 as illustrated.

The said connection 2 is provided with the valve 14, and the connection 4 is provided with the valve 15. The collecting tank 6 is provided with the drain or drip 16 which may be led to any suitable receptacle. In practice I prefer to lead it back to the tank 1 and to thus return the unconverted hydrocarbon 17 in said tank 6, by means not shown, to the circulating system.

18 represents a valve in the drain 16, 19 an inlet pipe for the brine circulating in the tank 13 and 20 represents an outlet for said tank 13. 21 represents an outlet for drawing off the water collecting in the refined oil tank 12, 22 a valve controlling said outlet 21, 23 an outlet for drawing off the gasolene or other oil collecting in the tank 12, and 24 a valve controlling said outlet 23.

To illustrate the carrying out of this process I may place in the receptacle 1 say 30 gallons of a suitable mixture of hydrocarbons, such for example, as kerosene having a specific gravity of say 44.5 Bé. I then add to said hydrocarbons say six pounds of lime preferably in a hydrated state, or in the form of a watery solution of slaked lime which is thoroughly mixed with the oil. All of the valves may now be opened whereupon steam under pressure of from say 10 to 25 pounds, and having a temperature of say between 194° F. to about 240° F., or higher will be admitted through the pipe 4 into the suction apparatus 3. The injector nozzle 30 with which the steam pipe 4 is provided will now, through the vacuum formed in the funnel shaped member 31, cause the mixture of lime and kerosene to be drawn in through the suction nozzle 32 with which the connection 2 is provided with the result that a most intimate mixture of steam, oil and lime will be had. This mixture will pass through the connection 5 into the collecting chamber 6, along with lighter hydrocarbon mixtures or groups that have been formed as a result of the catalytic action of the lime on the heavier hydrocarbons in the presence of the steam.

In the said collecting chamber the oil 17, which has not been converted into lighter compounds by the steam and lime, will collect at the bottom of said tank 6, as shown, while the mixed hydrocarbon vapors and steam will pass through the connection 7 into the settling tank 8 in which a considerable portion of the steam will settle out in the form of water, as well as any other portions of unconverted oil which may have been carried over by the said vapors and steam through the pipe 7. From the tank 8 the mixture of steam and gasolene passes through the pipe 9, through the cooling coil 10 and into the refined oil tank 12. This said tank 12 being cooled by any suitable means as by the brine circulating in the tank 13, the remaining portion of the steam is condensed in the bottom of said tank 12 and may be drawn off through the pipe 21. The lighter hydrocarbons thus formed will collect near the top of the tank 12 and may be drawn off through the pipe 23. It will thus be observed that in the presence of lime and steam at a temperature of say 250° F., I am enabled, by following the above procedure, to produce a profound change in the gravity of the kerosene. This is a temperature well below that at which permanent gases are given off.

As a matter of fact, I have repeatedly produced in practice as much as 50% or 55% of lighter hydrocarbons from kerosene thus treated. The unconverted kerosene 17 contains substantially all of the lime unchanged and when the latter along with the said unconverted kerosene is returned to the tank 1, I may use the lime over and over again.

I am unable to state positively just what are the scientific principles underlying these most remarkable results but I believe the latter to be due to a catalytic action of the lime in the presence of the steam, which results in a molecular rearrangement of a large percentage of the hydrocarbon molecules and the formation of lighter hydrocarbons from the original heavier oil used. It is an observed fact that permanent gases do not seem to be evolved in any noticeable quantity as a result of the action of the lime.

Whatever may be the true explanation it is a fact that I have repeatedly in practice employed kerosenes having boiling points from 320° F. to 580° F., and after subjecting them to the above mentioned process I have converted more than 50% of said kerosenes into lighter hydrocarbon products having boiling points from 260° F. to 420° F.

It will be further observed that by following the above procedure I am enabled to avoid the employment of heating furnaces or other suitable apparatus now in common use in converting mixtures of heavy hydrocarbons into mixtures of lighter hydrocarbons, and therefore, I am by this invention enabled to provide a continuous process and thus avoid the well recognized disadvantages of the intermittent processes entailed by said furnaces. It will be still further observed that the above mentioned efficient results are readily attained with temperatures as low as 250° F., and at pressures as low as 25 pounds per square inch, so that the apparatus employed is not only simple, but is easily constructed, not liable to get out of order, is not dangerous in use, and of course is comparatively inexpensive to construct.

With an apparatus built in accordance with the accompanying drawing and with 30 gallons of kerosene I have been enabled to convert more than say 50% of the latter into lighter hydrocarbons at the rate of about one gallon per minute.

Not only may lime be employed in carrying out the above process but I have also found that a very large variety of chemical compounds containing oxygen will produce qualitatively the same results.

Of these compounds I have found that the hydrates of the alkali metals, and alkali earth metals are especially suitable for my purpose, and of these hydrates, I prefer lime, as it is the most convenient to obtain, as well as the least expensive.

Instead of kerosene, of course, I may employ other hydrocarbon mixtures, with the same qualitative results.

It is found that when the process is carried out in the manner above disclosed that the well known bluish color that usually appears in kerosene, for example, and which is known as the "bloom" substantially, or entirely disappears. This disappearance of the bloom constitutes a valuable feature of the process because it renders the oil suitable for certain well known uses for which it would not be suitable without the removal of the bloom, and as the bloom is removed by this process, in a more expeditious and less costly manner than has been heretofore proposed, it will be readily appreciated that this feature is of considerable commercial value.

It is obvious that those skilled in the art may vary the details of the steps constituting the process as well as the arrangement of parts constituting the apparatus, and therefore, I do not wish to be limited to the above disclosure except as may be required by the claims.

What I claim is:—

1. The process of obtaining lighter hydrocarbons from an oil containing heavier hydrocarbons which consists in adding lime to said oil; subjecting for a time sufficient to evolve said lighter hydrocarbons the mixture to the atomizing action of steam at a temperature below that at which permanent gases will be given off; and suitably separating said lighter hydrocarbons from the residue, substantially as described.

2. The continuous process of producing lighter hydrocarbons from an oil containing heavier hydrocarbons which consists in mixing hydrated lime with said oil; continuously subjecting the mixture to the atomizing action of steam at a temperature below that at which permanent gases will be given off and under a super atmospheric pressure sufficient to produce a substantial percentage of said lighter hydrocarbons from said oil; and suitably separating out said lighter hydrocarbons, substantially as described.

3. The process of producing lighter hydrocarbons from an oil containing heavier hydrocarbons, which consists in subjecting said heavier hydrocarbons to the action of steam and lime in a finely divided condition at a temperature and pressure below points at which permanent gases are given off, and for a time sufficient to produce said lighter hydrocarbons from said oil, substantially as described.

4. The process of producing lighter hydrocarbons from an oil containing heavier hydrocarbons while at the same time removing the bloom from the oil, which consists in subjecting said heavier hydrocarbons for a time sufficient to evolve substantial portions of said lighter hydrocarbons to the action of steam and hydrated lime at a temperature below that at which permanent gases are given off; and condensing the lighter hydrocarbons thus obtained to the liquid form, substantially as described.

5. The process of converting heavier hydrocarbons contained in a hydrocarbon oil into lighter hydrocarbons which consists in subjecting said heavier hydrocarbons to the atomizing action of steam and lime at a temperature below that at which permanent gases are given off and for a time sufficient to change substantial portions of said heavier hydrocarbons into lighter hydrocarbons, substantially as described.

In testimony whereof I affix my signature.

CHARLES L. LIGHTENHOME.